United States Patent
Gottwald et al.

(10) Patent No.: US 7,145,505 B2
(45) Date of Patent: Dec. 5, 2006

(54) DEVICE FOR DETECTING AND EVALUATING OBJECTS IN THE SURROUNDINGS OF A VEHICLE

(75) Inventors: Frank Gottwald, Weissach (DE); Tore Toennesen, Reutlingen (DE); Dirk Steinbuch, Wimsheim (DE)

(73) Assignee: Robert Bosch GmbH, Stuttgart (DE)

(*) Notice: Subject to any disclaimer, the term of this patent is extended or adjusted under 35 U.S.C. 154(b) by 209 days.

(21) Appl. No.: 10/503,861

(22) PCT Filed: Jun. 5, 2003

(86) PCT No.: PCT/DE03/01855
§ 371 (c)(1),
(2), (4) Date: Aug. 6, 2004

(87) PCT Pub. No.: WO2004/019057
PCT Pub. Date: Mar. 4, 2004

(65) Prior Publication Data
US 2005/0105075 A1 May 19, 2005

(30) Foreign Application Priority Data
Aug. 17, 2002 (DE) ................. 102 37 790

(51) Int. Cl.
*G01S 7/28* (2006.01)
*G01P 3/36* (2006.01)
*G01C 3/08* (2006.01)

(52) U.S. Cl. .................. 342/175; 342/70; 356/4.01; 356/28

(58) Field of Classification Search ............ 342/70–72, 342/175; 343/700 MS; 356/4.01, 28
See application file for complete search history.

(56) References Cited

U.S. PATENT DOCUMENTS

| 3,120,640 | A | * | 2/1964 | Midlock et al. ............ 455/90.3 |
| 3,187,329 | A | * | 6/1965 | Midlock .................... 342/104 |
| 4,532,515 | A | | 7/1985 | Cantrell et al. ............ 342/147 |
| 4,595,926 | A | * | 6/1986 | Kobus et al. ............... 342/368 |
| 5,229,885 | A | * | 7/1993 | Quaglia ..................... 359/665 |
| 5,254,998 | A | | 10/1993 | LaBerge et al. ........... 342/173 |
| 5,264,859 | A | * | 11/1993 | Lee et al. ................... 343/754 |

(Continued)

FOREIGN PATENT DOCUMENTS

DE 0 660 135 A 6/1995

(Continued)

OTHER PUBLICATIONS

"System requirements for automotive radar antennas", Hoare, E.G.; Hill, R. Antennas for Automotives (Ref. No. 2000/002), IEE Colloquium on 2000 P(s):1/1-111.*

*Primary Examiner*—John B. Sotomayor
(74) *Attorney, Agent, or Firm*—Michael J. Striker

(57) ABSTRACT

An apparatus 1 for detecting and evaluating objects in the vicinity of a vehicle, having transmitting and receiving means for electromagnetic radiation in the Gigahertz range, includes at least one antenna protected by a radome 11a, 11b. The radome 11a, 11b is designed as lens-shaped in such a way that beam focusing and/or beam pivoting of the broadcast electromagnetic radiation is made possible.

15 Claims, 4 Drawing Sheets

U.S. PATENT DOCUMENTS

| | | | | |
|---|---|---|---|---|
| 5,448,244 | A | 9/1995 | Komatsu et al. | 342/147 |
| 5,512,901 | A * | 4/1996 | Chen et al. | 342/175 |
| 5,680,139 | A | 10/1997 | Huguenin et al. | |
| 5,757,074 | A | 5/1998 | Matloubian et al. | 257/702 |
| 6,107,956 | A * | 8/2000 | Russell et al. | 342/70 |
| 6,150,974 | A * | 11/2000 | Tasaka et al. | 342/53 |
| 6,246,298 | B1 * | 6/2001 | Ishikawa et al. | 333/101 |
| 6,433,751 | B1 * | 8/2002 | Ishitobi et al. | 343/753 |
| 6,496,138 | B1 * | 12/2002 | Honma | 342/70 |
| 6,674,392 | B1 * | 1/2004 | Schmidt et al. | 342/70 |
| 6,816,105 | B1 | 11/2004 | Winner et al. | 342/118 |
| 7,058,362 | B1 * | 6/2006 | Khorrami et al. | 455/66.1 |
| 2003/0117311 | A1 | 6/2003 | Funai | |
| 2003/0142006 | A1 | 7/2003 | Walton et al. | |
| 2004/0090361 | A1 | 5/2004 | Brosche | |
| 2004/0090368 | A1 * | 5/2004 | Channabasappa et al. | 343/700 MS |
| 2004/0113840 | A1 * | 6/2004 | Gottwald et al. | 343/700 MS |
| 2005/0104780 | A1 * | 5/2005 | Gottwald et al. | 343/700 MS |
| 2005/0105075 | A1 * | 5/2005 | Gottwald et al. | 356/4.01 |

FOREIGN PATENT DOCUMENTS

| | | |
|---|---|---|
| DE | 44 12 770 A | 10/1995 |
| DE | 196 21 075 C | 2/1998 |
| DE | 197 12 098 A | 5/1998 |
| DE | 197 03 095 C | 6/1998 |
| DE | 199 41 931 A | 3/2001 |
| DE | 199 63 005 A1 | 6/2001 |
| EP | 789421 A2 * | 8/1997 |
| EP | 0 884 799 A | 12/1998 |
| JP | 02262703 A * | 10/1990 |
| JP | 11316274 A * | 11/1999 |
| WO | 01 26183 A | 4/2001 |

* cited by examiner

DEVICE FOR DETECTING AND EVALUATING OBJECTS IN THE SURROUNDINGS OF A VEHICLE

CROSS-REFERENCE

The invention described and claimed hereinbelow is also described in PCT/DE 03/01855, filed Jun. 5, 2003 and DE 102 37 790.1, filed Aug. 17, 2002. This German Patent Application, whose subject matter is incorporated here by reference, provides the basis for a claim of priority of invention under 35 U.S.C. 119 (a)–(d).

BACKGROUND OF THE INVENTION

The invention relates to an apparatus for detecting and evaluating objects in the vicinity of a vehicle.

An apparatus for detecting and evaluating objects in the vicinity of a vehicle of this generic type is known from German Patent Disclosure DE 199 63 005 A1 of the present applicant. It includes a pulse radar sensor with transmitting and receiving means for transmitting and receiving electromagnetic waves in the Gigahertz range. The electromagnetic waves are broadcast and received by an antenna. Typically, to protect such antennas against harmful environmental factors, a so-called radome is provided. This coined term radome means a spherical protective dome. In the present application, the term radome is also used for protective means that are not spherical.

SUMMARY OF THE INVENTION

The invention offers the advantages in particular that because of the design of the radome, beam shaping and in particular beam propagation and/or pivoting are made possible. Beam propagation in a horizontal plane serves to broaden the detection range to an extent that could not be attained with a conventional radome. Beam pivoting makes easy adaptation to the body shape of the particular vehicle possible and thus offers greater flexibility in installing the apparatus. Hence most of the components of the apparatus can be identical parts that can be mass-produced in large numbers. The adaptation to the radiation characteristic required for a particular vehicle type is then by means of the radome designed according to the invention. The radomes can be connected to the apparatus by means of a clip connection, making installation especially easy.

BRIEF DESCRIPTION OF THE DRAWING

The apparatus of the invention will now be described in terms of the exemplary embodiments shown in the drawing. Shown are.

DETAILED DESCRIPTION OF THE PREFERRED EMBODIMENTS

Figure 1:
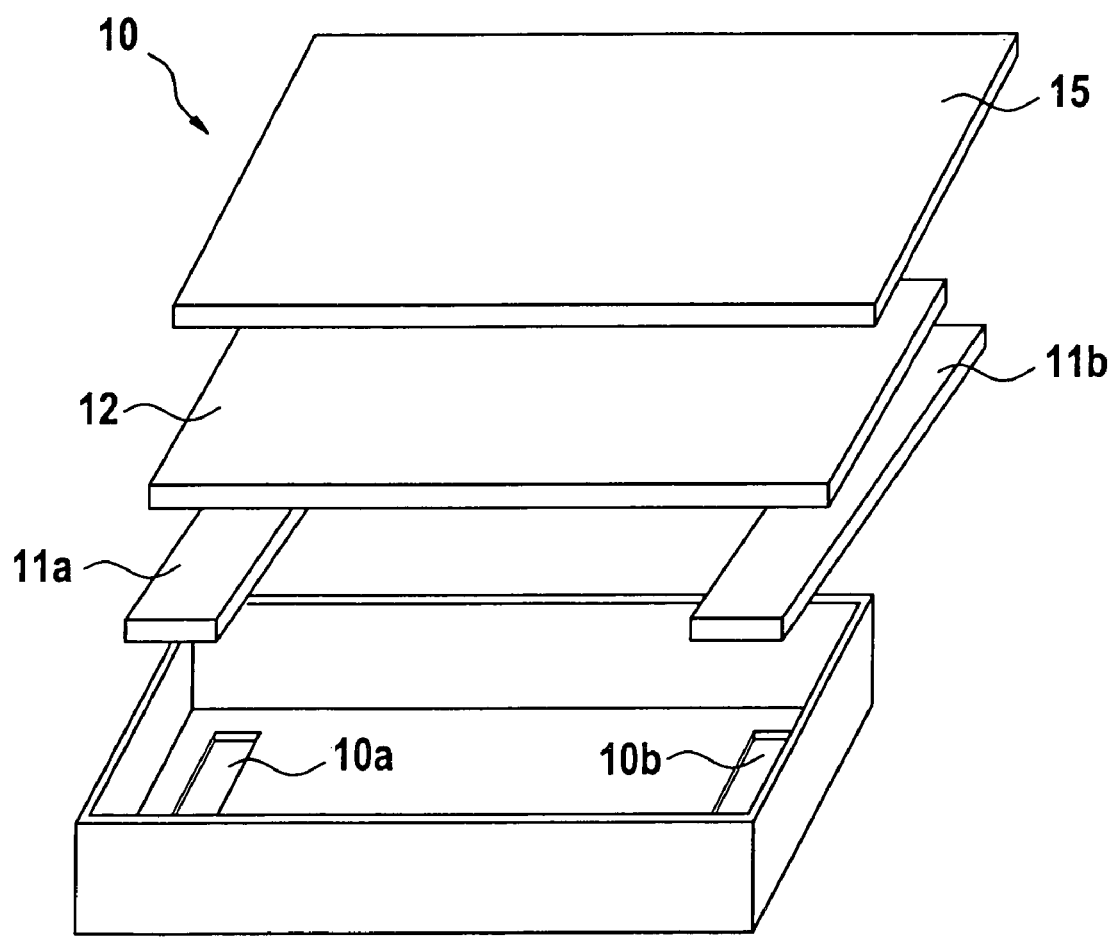
FIG. 1, the apparatus with its essential component groups in an exploded view.

FIG. 1 shows the apparatus 1 with its essential component groups in an exploded view. The apparatus 1 includes a tublike housing 10, 15, with a housing tub 10 and a cap 15. The other component groups 11a, 11b and 12 are mounted in the housing tub, which is closed with the cap 15 after these component groups have been installed. Reference numerals 10a and 10b designate recesses in the bottom of the housing tub 10. These recesses are designed in slotlike form and extend parallel to one another in opposed regions of the bottom of the housing tub 10. The electromagnetic energy is broadcast through these slotlike recesses 10a, 10b. Reference numerals 11a, 11b designate radomes. These radomes are designed essentially in striplike form and can be placed in the housing tub 10 in such a way that they cover the slotlike recesses 10a, lob in the bottom of the housing tub. Thus they close off the housing 10, 15 from the outside in its bottom region and accordingly take over the usual protective function of a radome, which shields off vulnerable high-frequency components from harmful environmental factors.

Especially advantageously, the radomes 11a, 11b can be connected to the housing tub 10, or to the further component groups 12, by means of a clip connection. This makes installing the apparatus 1 substantially simpler and easier.

Figure 2:
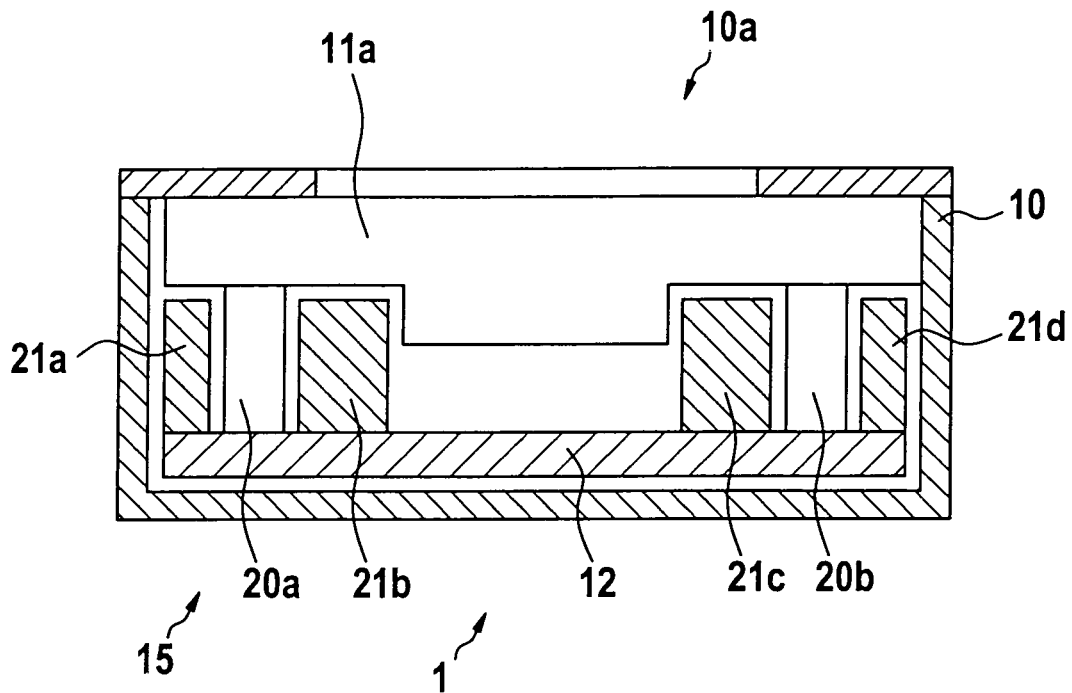
FIG. 2, a cross section through the apparatus with a first exemplary embodiment of a radome.
Figure 3:
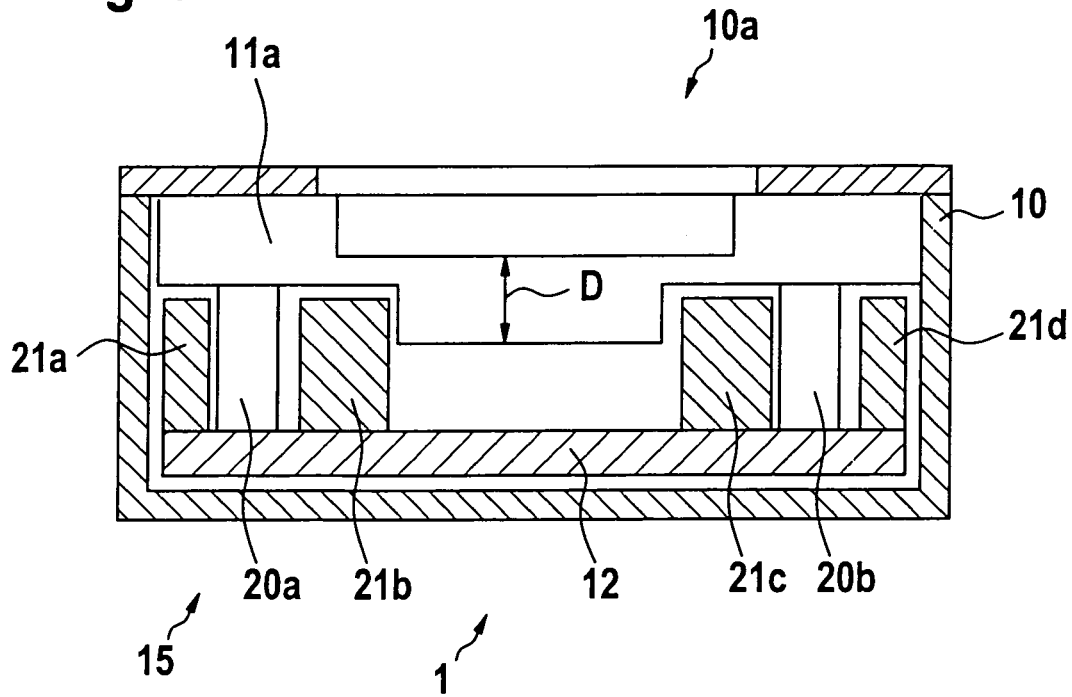
FIG. 3, a cross section through the apparatus with a second exemplary embodiment of a radome.
Figure 4:
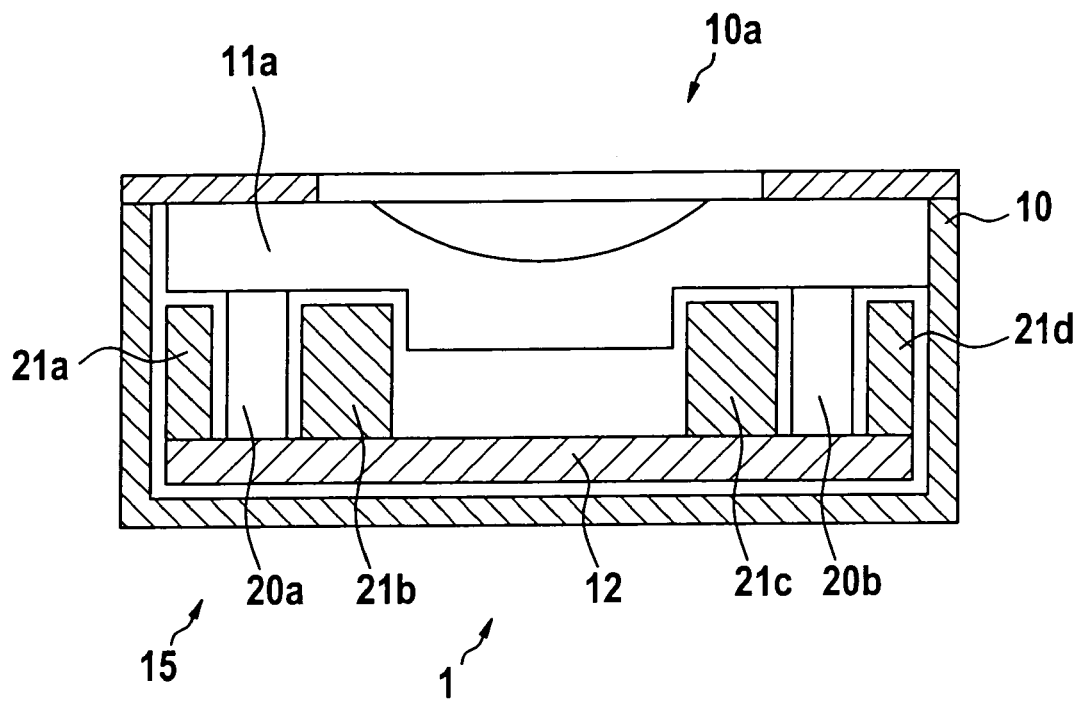
FIG. 4, a cross section through the apparatus with a third exemplary embodiment of a radome.
Figure 5:
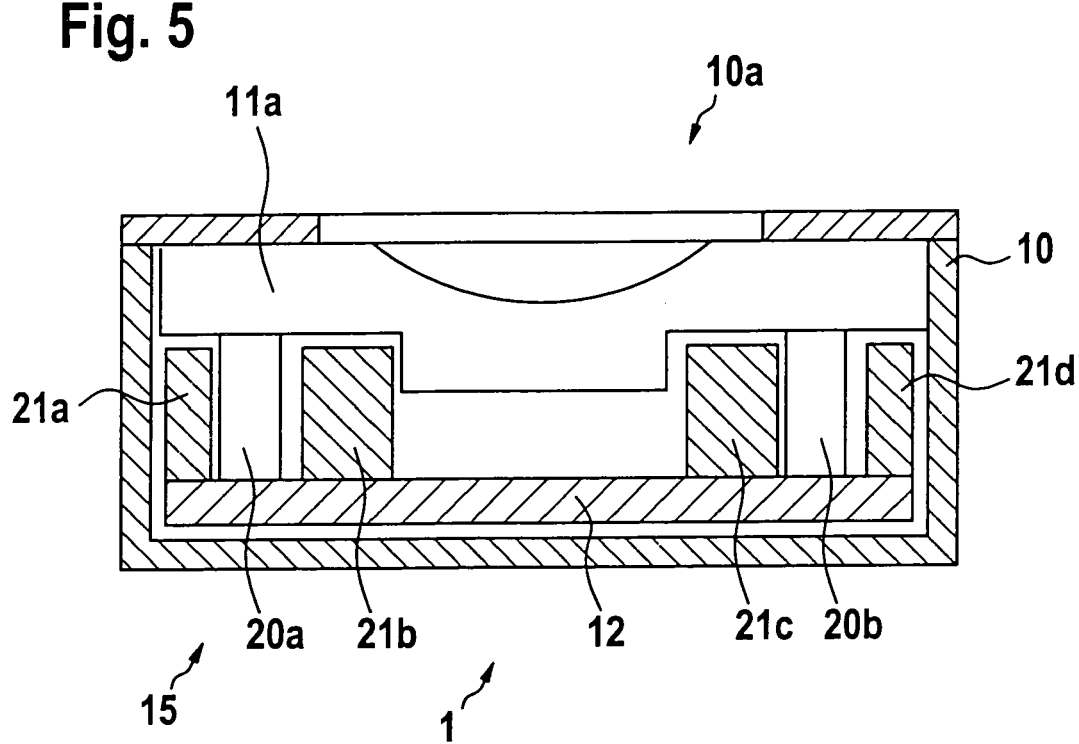
FIG. 5, a cross section through the apparatus with a fourth exemplary embodiment of a radome.

According to the invention, the radomes 11a, 11b are designed such that they not only perform the protective function known from conventional radomes but also effect beam shaping and/or beam deflection. This will be described below in terms of several exemplary embodiments. FIGS. 2, 3, 4 and 5 each show a cross section through the apparatus 1 along a recess 10a, 10b in the bottom of the housing tub 10. The exemplary embodiment shown in FIG. 2 illustrates in principle how the radome 11a, placed in the housing tub 10, covers the recess 10a in the bottom of the housing tub 10 and thus closes off the housing 10, 15 from the environment. Especially advantageously, the radome 11a can be clipped onto carriers 21a, 21b, 21c, 21d, which are connected to the printed circuit board 12. In the process of installing the radome 11a, to assure a defined installed position, the essentially striplike radome 11a can expediently also be provided with spacers 20a, 20b, which preferably extend perpendicular to a main face of the radome 11a. The radome 11a preferably comprises a material that is highly permeable to high-frequency radiation in the Gigahertz range yet is weatherproof, since in everyday operation of a vehicle it is exposed to severe environmental conditions. A thermoplastic, in particular PBT (polybutylene terephthalate) has proved especially highly suitable. To keep the damping of the electromagnetic waves by the loss-impeded material of the radome 11a, 11b as slight as possible, the thickness D of the radome 11a, 11b is reduced in the region of the recesses 10a, 10b as far as the mechanical stability and technical production capabilities allow. In practice, a thickness D of the radome 11a, 11b of between 0.2 mm and 15 mm can be considered. An especially favorable compromise in view of both a low damping value and still adequate mechanical stability is a thickness D of the radome 11a, 11b of 1.0 mm. As FIG. 2 shows, for that purpose a recess is made in the outer surface of the radome 11a, 11b that reduces the thickness D of the radome in this region as desired. From a production standpoint, recesses that are rotationally symmetrical are especially simple, in which case the surface of the recess has the shape of a portion of a sphere or a spherical layer, for instance. However, arbitrary other structures of the recess can readily be attained from a production standpoint. Especially advantageously, the shaping of the recess serves the purpose of varying the beam, and in particular beam shaping and/or beam deflection of the broadcast electromagnetic energy. In an especially advantageous exemplary embodiment of the invention (FIG. 4), the recess is designed cylinder-symmetrically; that is, the outer surface of the recess is part of a cylindrical jacket face. As a result of such a design, the radome 11a, 11b functions as a cylinder lens, which enables beam propagation in a horizontal plane. As a result, an especially favorable broadening of the detection range is made possible.

In a further exemplary embodiment (FIG. 5), the recess has the shape of an asymmetrically embodied cylinder lens. As a result, beam deflection or beam pivoting can be attained in a simple way. In turn as a result, the radiation characteristic of the apparatus can be adapted especially simply to different body shapes of vehicles. In this way, great flexibility is obtained in terms of a favorable installation site for the apparatus. It is understood to be within the scope of the present invention to provide still other lens shapes in conjunction with the radome 11a, 11b.

Figure 6:
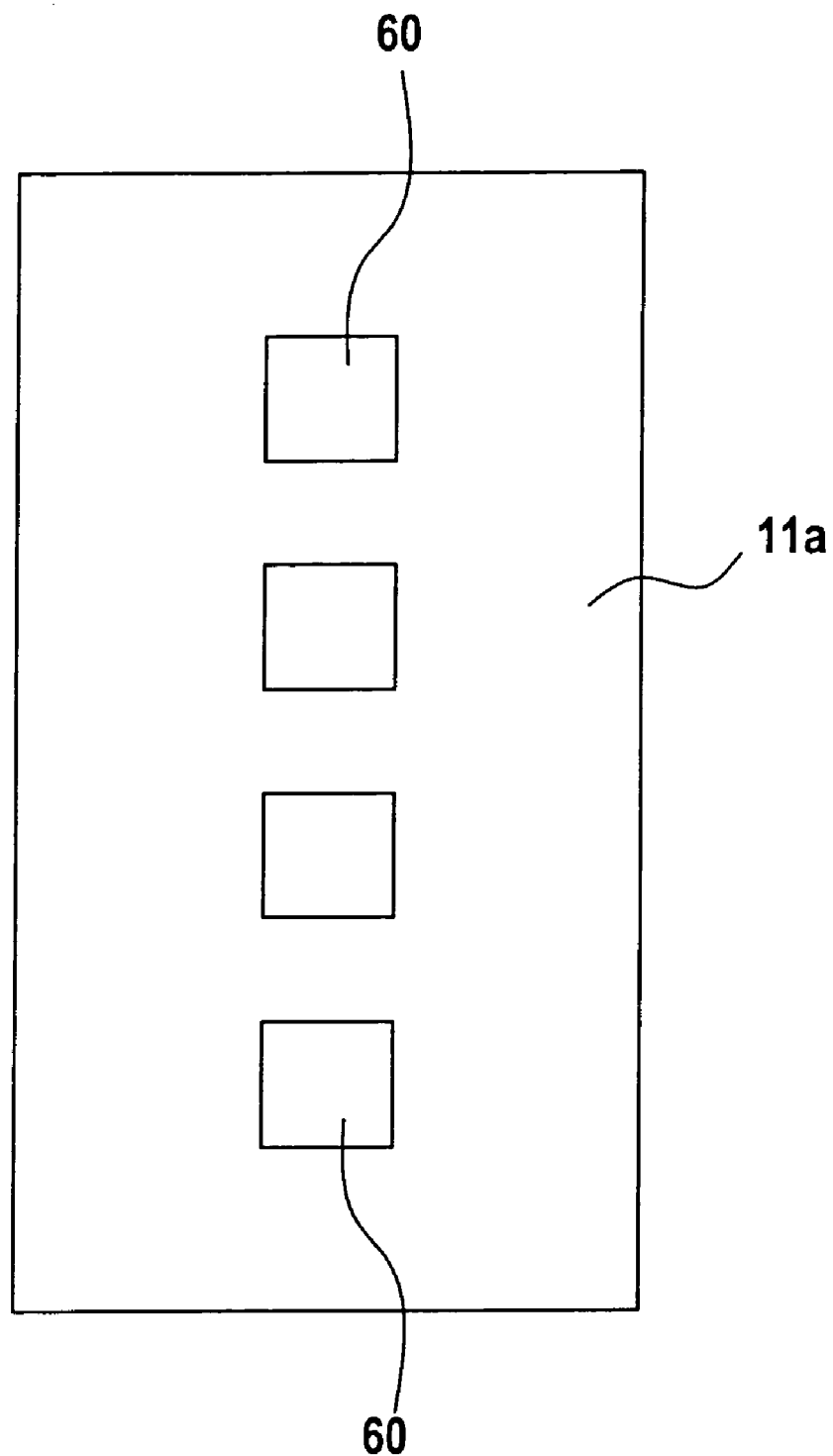
FIG. 6, a plan view on a striplike radome.

In an apparatus 1 that includes a plurality of antennas next to one another, a radome 11a which, as shown in FIG. 6, has a plurality of regions 60 that vary the electromagnetic radiation in the sense of beam focusing and/or deflection proves to be expedient.

The invention claimed is:

1. An apparatus for detecting and evaluating objects in the vicinity of a vehicle, having transmitting and receiving means for generating, broadcasting and receiving electromagnetic radiation in the Gigahertz range, the transmitting and receiving means including a plurality of antennae (10a, 10b), wherein said plurality of antennae are covered by a plurality of striplike radomes (11a, 11b), wherein the radomes (11a, 11b) are formed such that they perform a protective function as well as a beam-shaping and/or beam deflection function.

2. The apparatus of claim 1, wherein at least one recess is disposed in the outer surface of the radome (11a, 11b).

3. The apparatus of claim 1, wherein that the recess is formed to be rotationally symmetrical.

4. The apparatus of claim 1, wherein the recess is embodied as a concave lens.

5. The apparatus of claim 1, wherein the recess is formed to be cylinder-symmetrical.

6. The apparatus of claim 5, wherein the recess is embodied as a cylinder lens which effects a beam propagation in a horizontal plane.

7. The apparatus of claim 1, wherein the recess is embodied asymmetrically.

8. The apparatus of claim 7, wherein the recess is embodied as an asymmetrical cylinder lens.

9. The apparatus of claim 1, wherein the radomes (11a, 11b) are is embodied essentially in striplike form.

10. The apparatus of claim 1, wherein the thickness (D) of the radomes (11a, 11b), at least in its region that is permeable to electromagnetic radiation, is between 0.2 mm and 15 mm, preferably 1.0 mm.

11. The apparatus of claim 1, wherein the radomes (11a, 11b) include spacers (20a, 20b), which extend perpendicular to a main face of the radome (11a, 11b).

12. The apparatus of claim 1, wherein on the striplike radomes (11a, 11b), a plurality of regions (60) that vary the radiation in the sense of beam focusing and/or deflection are provided.

13. The apparatus of claim 1, wherein the radomes (11a, 11b) comprise a plastic material.

14. The apparatus of claim 13, wherein the radomes comprise a thermoplastic, in particular PBT (polybutylene terephthalate).

15. An apparatus for detecting and evaluating objects in the vicinity of a vehicle, having transmitting and receiving means for generating, broadcasting, and receiving electromagnetic radiation in the Gigahertz range, the transmitting and receiving means including at least one radome-covered antenna, the radome having a plurality of regions (60) that vary the radiation in the sense of beam focusing and/or deflection.

* * * * *